Patented Aug. 23, 1938

2,127,986

UNITED STATES PATENT OFFICE 2,127,986

AZO DYESTUFFS

Hans Roos, Leverkusen-I. G.-Werk, Germany, assignor to General Aniline Works, Inc., New York, N. Y., a corporation of Delaware No Drawing. Application January 30, 1935, Serial No. 4,185. In Germany February 9, 1934

4 Claims. (Cl. 260—160)

The present invention relates to new azo dyestuffs, more particularly it relates to dyestuffs which are characterized by containing in the molecule in o-position to an azo group an aminoaroylamino or an aminoaroylaminoaroylamino group.

In accordance with the present invention new azo dyestuffs which are characterized by containing in o-position to an azo group, either in a diazotization component or in a coupling component, an aminoaroylamino or an aminoaroylaminoaroylamino group, are prepared by starting with an aminoazo dyestuff containing the amino group in o-position to an azo group, condensing the same with a nitroaroylhalogenide, reducing the nitro group to the amino group, and, if desired, introducing into the amino group formed an aminoaroyl group in the same manner.

As the new products are substantially intended to find application for dyeing fibres, the components used in their manufacture should be chosen in such a manner that at least one group rendering same soluble in water or aqueous alkalies, such as the sulfonic acid group, is present in the ready dyestuff. Due to the free amino group the new dyestuffs can be subjected in substance or on the fibre to all the reactions known for aminoazo dyestuffs. Thus, they can be diazotized in substance or on the fibre and coupled with azo dyestuff coupling components; further they can be condensed with nitroaroylhalogenides, if desired, after coupling with suitable coupling components, reduced to aminoazo dyestuffs, diazotized and coupled, or they can be transformed into ureas or thioureas, either directly or after converting into other aminoazo dyestuffs.

The starting o-aminoazo dyestuffs used in the present invention are obtainable according to various methods. Part of them is obtainable by coupling diazo compounds with coupling components in o-position to an amino group; further, they can be prepared according to the process described in my application for Letters Patent, Serial No. 4,186, filed January 30, 1935, entitled "Process for the manufacture of azo dyestuffs", by reacting upon an aromatic nitro-compound with an aromatic o-diamine at elevated temperature in a solvent. It is self-understood that there can be used any o-amino dyestuffs, mono-azo dyestuffs as well as dis- and poly-azo dyestuffs. Further, I wish it to be understood that all the derivatives prepared in the usual manner from my new dyestuffs fall within the scope of the present invention.

The new dyestuffs generally dye the vegetable fibre various shades which are well dischargeable both with a neutral and with an alkaline discharge paste, while a large number of the known comparable dyestuffs containing the aminobenzoylamino group in p-position to the azo group has only an inferior dischargeability.

The invention is illustrated by the following examples, without being limited thereto:

*Example 1.*—29.9 kgs. of o-aminoazo benzene-3'-sulfonic acid are dissolved in water and condensed with 19 kgs. of p-nitrobenzoylchloride in the usual manner in the presence of an acid-binding agent, such as sodium acetate or soda, at 60–70° C. On cooling, the p-nitrobenzoyl-o-aminoazobenzene-3'-sulfonic acid crystallizes in pure form. After pressing, it is dissolved in water and reduced with 42 kgs. of sodium sulfide for about 30 minutes at 70° C. to the corresponding amino compound which is separted from the hot solution by salting out. The p-aminobenzoyl-o-aminoazobenzene-3'-sulfonic acid is again aminobenzoylated in the same manner as described above.

The dyestuff having in the free state the following formula:

dyes cotton yellow shades which after diazotizing and developing with 1-phenyl-3-methyl-5-pyrazolone yield a full yellow and with β-naphthol an orange. The shades are well dischargeable both with a neutral or alkaline discharge paste.

*Example 2.*—39.9 kgs. of o-aminodisazobenzene-4'-sulfonic acid are condensed with an equimolecular proportion of p-nitrobenzoylchloride and reduced with sodium sulfide, as described in Example 1. The dyestuff obtained having in the free state the following formula:

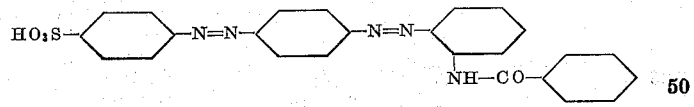

dyes cotton somewhat more reddish-yellow shades than the dyestuff described in Example 1; on diazotizing and developing on the fibre with 1-phenyl-3-methyl-5-pyrazolone, there is obtained a yellow, and with β-naphthol an orange. The dyeings have an excellent dischargeability.

*Example 3.*—32 kgs. of the sodium salt of p-aminobenzoyl - o - aminoazobenzene - 3' - sulfonic acid, prepared in accordance with Example 1, are dissolved in water, an aqueous solution of 7 kgs. of sodium nitrite is added thereto, and while stirring, 28 litres of hydrochloric acid of 19.5° Bé. are introduced. After two hours' stirring the diazotization is complete. The diazotization mixture is then poured into an aqueous solution of 36.2 kgs. of 2-(p-aminobenzoylamino)-5-naphthol-7-sulfonic acid to which solution 28 kgs. of soda have been added. For completing the coupling, the reaction mixture is stirred during the night; the dyestuff formed is filtered and dried. The dyestuff having in the free state the following formula:

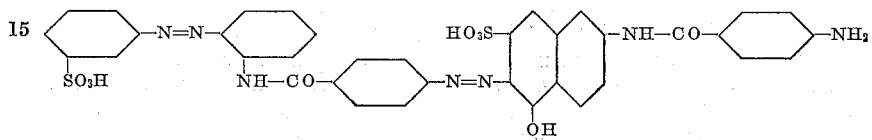

is obtained in form of an orange-red powder, dyeing the vegetable fibre orange-red shades which can be diazotized and coupled on the fibre with β-naphthol to a reddish-orange of excellent tinctorial properties, especially a good dischargeability both with a neutral and alkaline discharge paste.

By substituting the 2-(p-aminobenzoylamino)-5-naphthol-7-sulfonic acid by the 2-(m-aminobenzoylamino)-5-naphthol-7-sulfonic acid, there is obtained a dyestuff exerting similar properties, but yielding, when diazotized and coupled on the fibre with β-naphthol, more yellowish-orange shades.

Example 4.—32 kgs. of the sodium salt of p-aminobenzoyl-o-aminoazobenzene-3'-sulfonic acid are diazotized as described in Example 3. The diazotization mixture is then introduced into an aqueous solution of 19 kgs. of 1-(3'-aminophenyl)-3-methyl-5-pyrazolone and 28 kgs. of soda. When the coupling is complete, the precipitated dyestuff having in the free state the following formula:

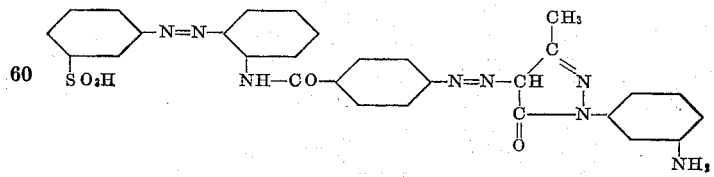

is pressed and dried. It dyes the fibre greenish-yellow shades, which tint remains unchanged when developing with 1-phenyl-3-methyl-5-pyrazolone. The dyeing exerts excellent fastness properties and can be discharged to a pure white.

If instead of m-aminophenylmethylpyrazolone there is used 1-phenyl-3-methyl-5-pyrazolone, a dyestuff exerting similar properties is obtained, which dyestuff, it is self-understood, can no more be developed on the fibre.

By developing the dyestuff of the formula of paragraph 1 with 1-(p-aminophenyl)-3-methyl-5-pyrazolone, there is obtained a more reddish-yellow.

Example 5.—The azo dyestuff prepared from 2-nitronaphthalene-4.8-disulfonic acid and o-phenylenediamine according to the process of my application for Letters Patent Serial No. 4,186, filed January 30, 1935, entitled "Process for the manufacture of azo dyestuffs", is transformed into the p-aminobenzoyl compound, as described in Example 1; 57.1 kgs. of the p-aminobenzoylated product are diazotized, as described in Example 3, and the diazotization mixture is poured into an aqueous solution of 48 kgs. of 2-(m-aminobenzoyl-m-aminobenzoyl)-amino-5-naphthol-7-sulfonic acid, to which solution 28 kgs. of soda have been added. The dyestuff obtained having in the free state the following formula:

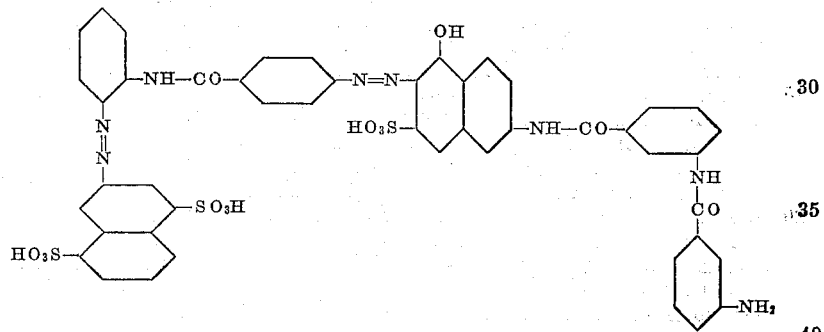

has properties similar to those of that described in Example 1, but on developing on the fibre with β-naphthol, yields more yellow shades.

If instead of 2-(m-aminobenzoyl-m-aminobenzoyl)-amino-5-naphthol-7-sulfonic acid there is used 2-(acetylamino)-5-naphthol-7-sulfonic acid, a dyestuff yielding similar shades, but which cannot be developed on the fibre, is obtained.

I claim:

1. Azo dyestuffs of the general formula:

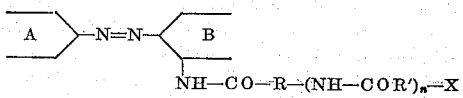

wherein A stands for a member selected from the group consisting of radicals of the naphthalene and benzene series free from a hydroxy or an amino group, B stands for a radical of the benzene series free from a hydroxy group and further amino and azo groups, R and R' stand for radicals of the benzene series and "$n$" stands for one or zero, and wherein X stands for a member selected from the group consisting of the amino group and the group N=N—R'', wherein R'' means a radical of an azo dyestuff coupling component, dyeing the vegetable fibre various shades which are well dischargeable both with a neutral and with an alkaline discharge paste.

2. Azo dyestuffs of the general formula:— wherein A stands for a radical of the benzene or naphthalene series free from a hydroxy or an amino group and D stands for the radical of a diazotizable azo dyestuff coupling component.

3. The azo dyestuff having in its free state the following formula:—

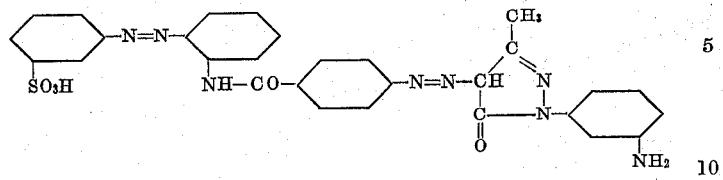

dyeing the fibre greenish yellow shades, which shades remain unchanged when diazotizing and developing with 1-phenyl-3-methyl-5-pyrazolone.

4. The azo dyestuff having in the free state the following formula:— dyeing the vegetable fibre yellow shades which after diazotizing and developing with β-naphthol are turned to a yellowish orange.

HANS ROOS.